US010704800B2

(12) United States Patent
Pridemore et al.

(10) Patent No.: US 10,704,800 B2
(45) Date of Patent: Jul. 7, 2020

(54) TETHERED CONTROL FOR DIRECT DRIVE MOTOR INTEGRATED INTO DAMPER BLADE

(71) Applicant: Johnson Controls Technology Company, Holland, MI (US)

(72) Inventors: Clark E. Pridemore, Grand Rapids, MI (US); Steven R. Palasek, Lowell, MI (US); Harvey Pastunink, Hudsonville, MI (US); Joseph Tyler Devine, Livonia, MI (US); James Charles Sharp, Lawton, MI (US); Robert Gerald Lee, Mason, MI (US)

(73) Assignee: Air Distribution Technologies IP, LLC, Milwaukee, WI (US)

( * ) Notice: Subject to any disclaimer, the term of this patent is extended or adjusted under 35 U.S.C. 154(b) by 232 days.

(21) Appl. No.: 15/279,392

(22) Filed: Sep. 28, 2016

(65) Prior Publication Data

US 2018/0087799 A1 Mar. 29, 2018

(51) Int. Cl.

| | |
|---|---|
| ***F24F 12/00*** | (2006.01) |
| ***F24F 13/15*** | (2006.01) |
| ***F24F 11/74*** | (2018.01) |
| ***F24F 11/30*** | (2018.01) |
| ***F24F 13/14*** | (2006.01) |

(Continued)

(52) U.S. Cl.

CPC .............. *F24F 12/00* (2013.01); *F24F 11/30* (2018.01); *F24F 11/74* (2018.01); *F24F 13/15* (2013.01); *F05B 2220/20* (2013.01); *F05B 2220/60* (2013.01); *F24F 11/52* (2018.01); *F24F 2013/1433* (2013.01); *F24F 2110/00* (2018.01); *F24F 2140/40* (2018.01); *H02J 7/0047* (2013.01)

(58) Field of Classification Search

CPC .......... F24F 12/00; F24F 13/082; F24F 13/15; H02J 7/0047

USPC .......................................................... 454/256

See application file for complete search history.

(56) References Cited

U.S. PATENT DOCUMENTS 4,018,159 A * 4/1977 Bennett .................. F24F 13/10 415/125

4,417,687 A 11/1983 Grant (Continued)

FOREIGN PATENT DOCUMENTS

JP S54-41562 A 4/1979

KR 2015-0030879 A 3/2015

(Continued)

OTHER PUBLICATIONS

The invitation to pay additional fees and, where applicable, protest fee mailed by European Patent Office dated Jul. 25, 2016 for PCT patent application No. PCT/US2016/028123.

(Continued)

*Primary Examiner* — Edelmira Bosques
*Assistant Examiner* — Frances F. Hamilton
(74) *Attorney, Agent, or Firm* — Fletcher Yoder P.C.

(57) ABSTRACT

A system for controlling air flow is provided that includes a damper disposed on a duct, an energy recovery system disposed within the duct a first predetermined distance from the damper and a controller coupled to the damper by a conductor and to the energy recovery system, the controller disposed within the duct a second predetermined distance from the damper.

17 Claims, 12 Drawing Sheets

(51) Int. Cl.

| | |
|---|---|
| ***F24F 11/52*** | (2018.01) |
| ***F24F 110/00*** | (2018.01) |
| ***H02J 7/00*** | (2006.01) |
| *F24F 140/40* | (2018.01) |

(56) References Cited

U.S. PATENT DOCUMENTS 5,251,815 A * 10/1993 Foye .................... G05D 7/0635 236/49.3
5,289,362 A * 2/1994 Liebl ...................... G06Q 50/06 165/268
5,364,304 A * 11/1994 Hampton ................ F24F 3/044 236/49.3
5,451,929 A * 9/1995 Adelman .............. F24F 3/1603 165/11.1
5,816,059 A * 10/1998 Ficchi, Jr. ............ G05B 19/048 62/127
6,014,839 A * 1/2000 Ruggles .................. E06B 7/086 327/307
6,363,736 B1 4/2002 Kunkel et al.
6,431,127 B2 8/2002 Weber
6,659,359 B2 * 12/2003 Kwak ..................... F24F 13/06 236/49.3
7,168,627 B2 * 1/2007 Kates ..................... F24F 11/006 165/208
7,347,774 B2 * 3/2008 Aronstam ............ F24F 11/0001 454/258
7,667,376 B2 2/2010 Schmidt
7,692,411 B2 4/2010 Trainor et al.
7,781,943 B1 8/2010 Hamel et al.
7,830,072 B2 11/2010 Schmidt
7,864,507 B2 1/2011 Fleig et al.
7,884,727 B2 2/2011 Tran
7,982,439 B2 7/2011 Trainor et al.
8,086,352 B1 12/2011 Elliott
8,228,151 B2 7/2012 Schmidt
8,249,731 B2 8/2012 Tran et al.
8,348,732 B2 * 1/2013 Aronstam ................. F24F 3/00 236/49.1
8,350,519 B2 1/2013 Brantner et al.
8,531,047 B2 9/2013 Schmidt et al.
8,535,126 B2 * 9/2013 Fincher ................. F24F 13/105 454/258
8,621,245 B2 12/2013 Sgearer et al.
8,727,843 B2 * 5/2014 McReynolds ....... F24F 13/1426 454/184
8,938,367 B2 * 1/2015 Patel ...................... B01D 46/10 702/138
8,940,078 B2 * 1/2015 Weiden ............. B01D 46/0086 95/23
9,157,645 B1 * 10/2015 Goss ......................... F24F 7/00
9,197,143 B1 11/2015 Townsend et al.
9,380,735 B2 * 6/2016 Chang ................ H05K 7/20836
9,680,324 B2 * 6/2017 Wiley ................... H02J 7/0029
9,689,617 B2 * 6/2017 Newman ................... F28C 3/06
9,812,926 B1 * 11/2017 Rodriguez ........... H02K 7/1823
9,854,335 B2 * 12/2017 Patel .................... F24F 11/0001
10,281,937 B2 * 5/2019 Barrett .................. F24F 13/082
10,393,401 B2 * 8/2019 Pridemore
2001/0025610 A1 10/2001 Weber
2004/0159713 A1 * 8/2004 Schmidt ................. F24F 11/053 236/49.3
2004/0166797 A1 * 8/2004 Thrasher ............... F24F 13/082 454/290
2004/0194484 A1 * 10/2004 Zou ....................... F24F 3/0442 62/186
2005/0040782 A1 2/2005 Jasinski et al.
2005/0087616 A1 4/2005 Attridge
2005/0144963 A1 7/2005 Peterson et al.
2005/0258259 A1 11/2005 Stanimirovic
2005/0270151 A1 12/2005 Winick
2005/0278069 A1 12/2005 Bash et al.
2006/0048525 A1 * 3/2006 Cook .................. F24F 13/1426 62/131
2006/0281435 A1 12/2006 Shearer et al.
2006/0286918 A1 * 12/2006 Vargas ............... B60H 1/00871 454/155
2007/0182362 A1 8/2007 Trainor et al.
2007/0264925 A1 * 11/2007 Mediato ............... B60H 1/3421 454/154
2008/0083446 A1 4/2008 Chakraborty et al.
2008/0119127 A1 * 5/2008 Stewart ................. F24F 13/082 454/256
2009/0102296 A1 4/2009 Greene et al.
2009/0111373 A1 * 4/2009 Hollender ........... F24F 13/1426 454/333
2009/0149123 A1 * 6/2009 Blagg ................. F24F 13/1426 454/258
2009/0168305 A1 7/2009 Fleig et al.
2009/0251099 A1 10/2009 Brantner et al.
2009/0293518 A1 * 12/2009 Bettella ................... F04D 25/12 62/186
2010/0060231 A1 3/2010 Trainor et al.
2010/0090656 A1 4/2010 Shearer et al.
2010/0139306 A1 6/2010 Krenik
2010/0163633 A1 * 7/2010 Barrett .................. F24F 13/082 236/49.3
2010/0277270 A1 11/2010 Aikens et al.
2010/0311317 A1 * 12/2010 McReynolds ...... G05D 23/2716 454/256
2010/0315046 A1 12/2010 Trainor et al.
2011/0021134 A1 * 1/2011 Zwern ....................... C02F 1/04 454/343
2011/0034120 A1 * 2/2011 Jaiyeola ............. G05D 23/1934 454/335
2011/0053487 A1 * 3/2011 Casey ................... F24F 13/082 454/258
2011/0077758 A1 3/2011 Tran et al.
2011/0109102 A1 5/2011 McCoy et al.
2011/0115222 A1 5/2011 Parker et al.
2011/0158806 A1 6/2011 Arms et al.
2011/0172828 A1 7/2011 Schmidt et al.
2011/0198404 A1 * 8/2011 Dropmann ............ F24F 13/082 236/49.3
2011/0208450 A1 8/2011 Salka et al.
2012/0068669 A1 3/2012 Trainor et al.
2012/0072030 A1 3/2012 Elliott
2012/0156981 A1 * 6/2012 Curtin ................ H05K 7/20618 454/184
2012/0256492 A1 10/2012 Song et al.
2012/0313588 A1 * 12/2012 Carberry .............. F24F 11/0034 320/134
2013/0013120 A1 1/2013 Sabripour
2013/0024029 A1 1/2013 Tran et al.
2013/0181689 A1 7/2013 Ocalan
2013/0201316 A1 8/2013 Binder et al.
2013/0217294 A1 8/2013 Karunaratne
2013/0325368 A1 * 12/2013 Robb ........................ G01P 5/00 702/45
2013/0328416 A1 12/2013 Whitworth et al.
2014/0111032 A1 * 4/2014 Shearer .............. G06K 19/0707 307/149
2014/0161673 A1 * 6/2014 Hammer ................. A61L 9/012 422/124
2014/0222216 A1 * 8/2014 Chen ........................ F24F 11/74 700/276
2014/0330438 A1 * 11/2014 Haines ................... G05B 15/02 700/276
2015/0013957 A1 * 1/2015 Van Dijk ................. G01K 1/14 165/217
2016/0007525 A1 1/2016 Drew et al.
2016/0040899 A1 * 2/2016 Lee ..................... F24F 13/1426 165/212
2016/0357199 A1 * 12/2016 Matlock ................. G05B 15/02
2017/0016641 A1 * 1/2017 Shvartser ......... F24F 11/0001ke

(56) References Cited

U.S. PATENT DOCUMENTS

| | | | | |
|---|---|---|---|---|
| 2017/0051931 | A1* | 2/2017 | Logan | F24F 11/72 |
| 2018/0051904 | A1* | 2/2018 | Pridemore | F24F 13/15 |

FOREIGN PATENT DOCUMENTS

| | | | |
|---|---|---|---|
| RU | 2538514 | C1 | 1/2015 |
| WO | 2014/018304 | A1 | 1/2014 |

OTHER PUBLICATIONS

The International Search Report and Written opinion issued by European Patent Office dated Oct. 25, 2016 for PCT patent application No. PCT/US2016/028123.

* cited by examiner

TETHERED CONTROL FOR DIRECT DRIVE MOTOR INTEGRATED INTO DAMPER BLADE

TECHNICAL FIELD

The present disclosure relates generally to heating, ventilation and air conditioning (HVAC) equipment, and more specifically to a tethered controller for a direct drive motor that is integrated into a damper blade to provide improved efficiency and control of damper blade positions.

BACKGROUND OF THE INVENTION

Motor-controlled damper positioners are known in the art. The motor is usually disposed adjacent to the damper blades, with a wired connection to a remote controller.

SUMMARY OF THE INVENTION

A system for controlling air flow is provided that includes a damper disposed on a duct, an energy recovery system disposed within the duct a first predetermined distance from the damper and a controller coupled to the damper by a conductor and to the energy recovery system, the controller disposed within the duct a second predetermined distance from the damper.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
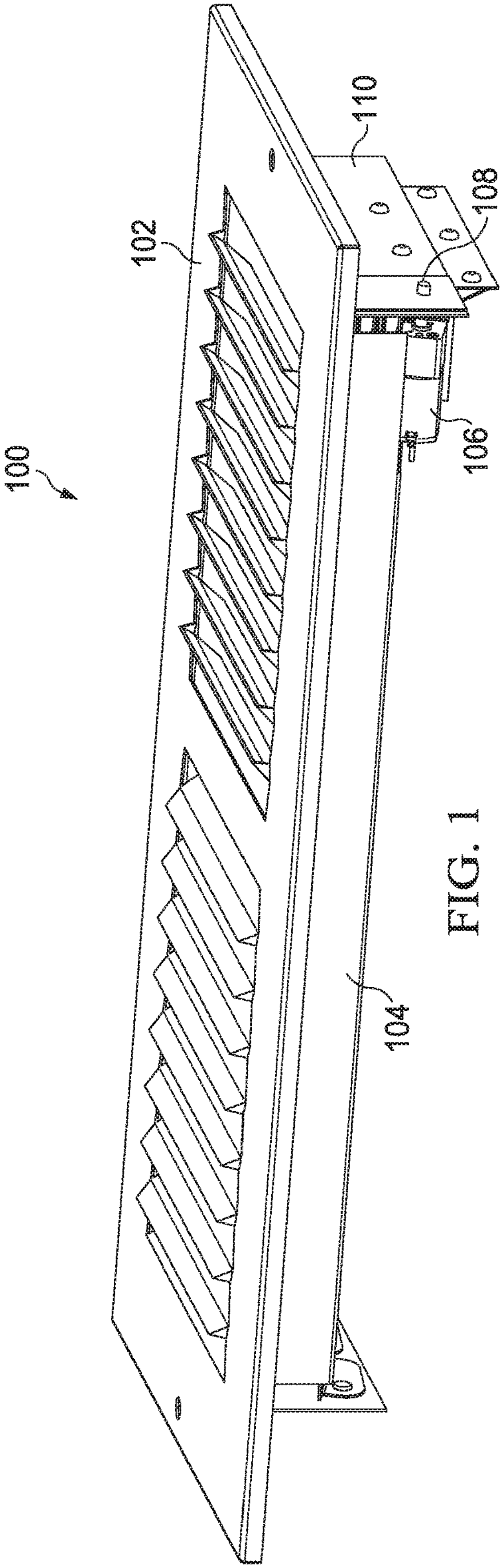
FIG. 1 is an isometric diagram of a damper unit, in accordance with an exemplary embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

FIG. 1 is an isometric diagram of a damper unit 100, in accordance with an exemplary embodiment of the present disclosure. Damper unit 100 can be fabricated from metal, plastic, composite materials, other suitable materials or a combination of materials, and includes grill 102, baffle 104, actuator 106, drive shaft 108 and support 110.

Grill 102 can provide fixed or movable vents, and is configured to attach to a standard residential or business HVAC duct. In one exemplary embodiment, grill 102 can be used to replace an existing grill that has been previously installed. In another exemplary embodiment, grill 102 can be used with a tethered energy recovery and control device.

Baffle 104 is disposed on grill 102 and forms a seal between grill 102 and the HVAC duct that grill 102 is disposed on. In one exemplary embodiment, baffle 104 can be cut to fit an HVAC duct, can be formed from flexible seal materials, or can otherwise be configured to provide an air-tight seal between grill 102 and the HVAC duct.

Actuator 106 is disposed on a damper blade and is used to cause the damper blade assembly to open and close upon receipt of motive power. In one exemplary embodiment, actuator 106 can be a direct drive DC motor, a stepper motor or other suitable motive power source.

Drive shaft 108 is keyed to interlock with a drive mechanism (not explicitly shown). In one exemplary embodiment, the key can include one or more interlocking surfaces that are used to convey torque or other suitable forces to the drive mechanism.

Support 110 holds a plurality of damper blade bearings or other suitable mechanical devices for allowing damper blades to move in a predetermined manner, such as to rotate open or closed, as well as a drive mechanism that is used to cause the damper blades to move, such as to rotate open and closed. In one exemplary embodiment, support 110 can also operate as a baffle to form a seal against the HVAC duct that grill 102 is disposed on.

In operation, damper unit 100 can be used to provide an interface between an HVAC duct and a room or other temperature controlled environment.

Figure 2:
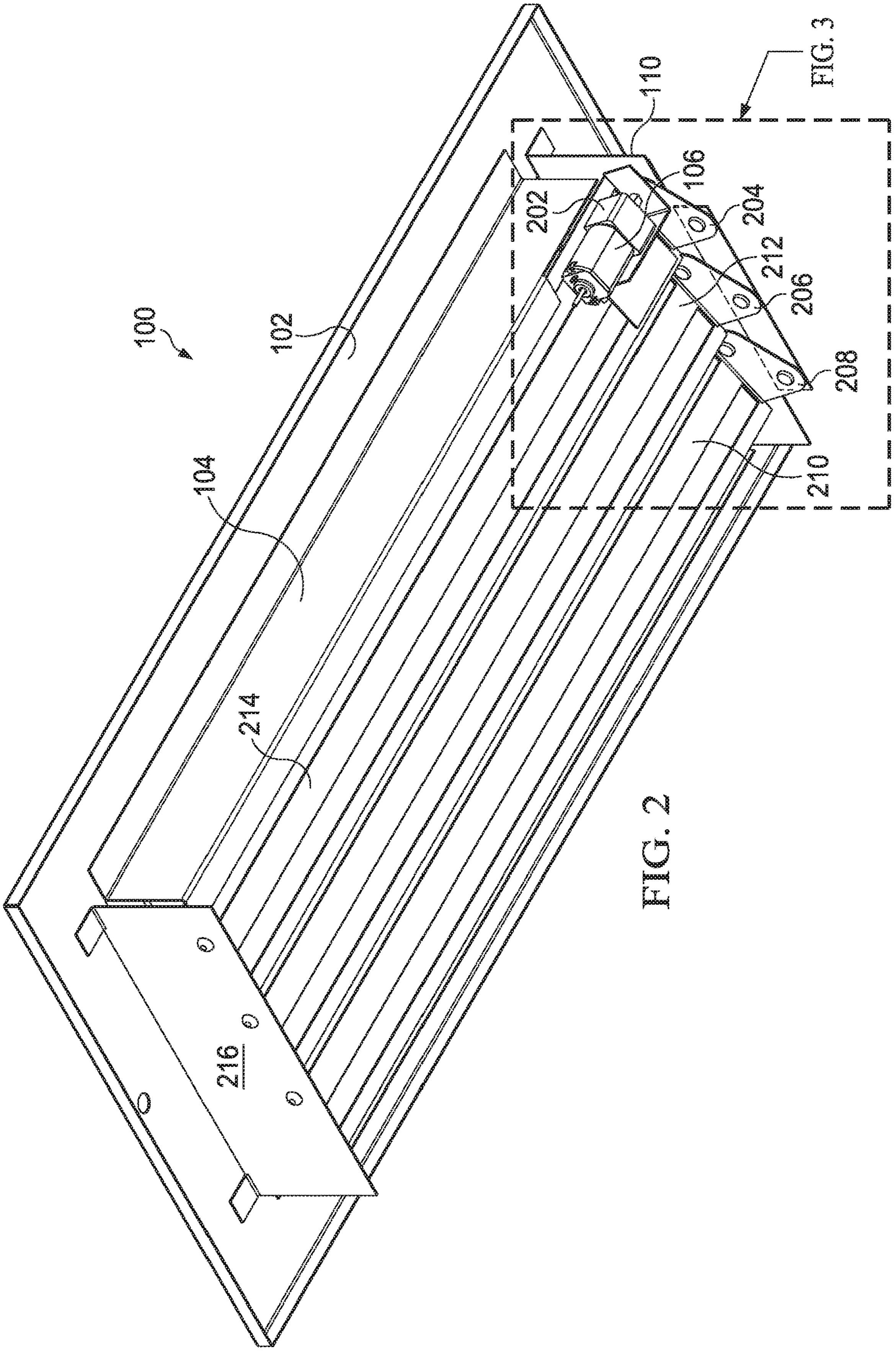
FIG. 2 is a diagram showing the bottom of a damper unit, in accordance with an exemplary embodiment of the present disclosure.

FIG. 2 is a diagram showing the bottom of damper unit 100, in accordance with an exemplary embodiment of the present disclosure. FIG. 2 includes gearbox 202 and blade arm 204 and blade 214, blade arm 206 and blade 212, blade arm 208 and blade 210, and support 216, which can each be fabricated from metal, plastic, composite materials, other suitable materials or a combination of materials.

Gearbox 202 is used to reduce the number of rotations and increase the amount of torque provided by actuator 106 to drive shaft 108. In one exemplary embodiment, gearbox 202 can include spur gears, planetary gears, helical gears, herringbone gears or other suitable gears that are used to transform torque from actuator 106 at a high number of revolutions per minute and a low torque, to a low number of revolutions per minute and a high torque.

Blade arm 204 and blade 214, blade arm 206 and blade 212, blade arm 208 and blade 210, and support 216 are configured to allow the rotation of blades 210, 212 and 214 from the application of force from drive shaft 108 to support 110 and the application of force from gearbox 202 to support 302. In one exemplary embodiment, each blade arm can be coupled to a transmission assembly that transmits force to or from an adjacent blade arm.

Further to this exemplary embodiment, drive shaft 108 can be keyed to interlock with support 110. Actuator 106 can also be mounted on blade arm 204, such that when actuator 106 is activated, drive shaft 108 remains static relative to support 110 but causes actuator 106 to rotate, such that actuator 106 and blade arm 204 rotates to cause blade 210, blade 212 and blade 214 to open or close.

Figure 3:
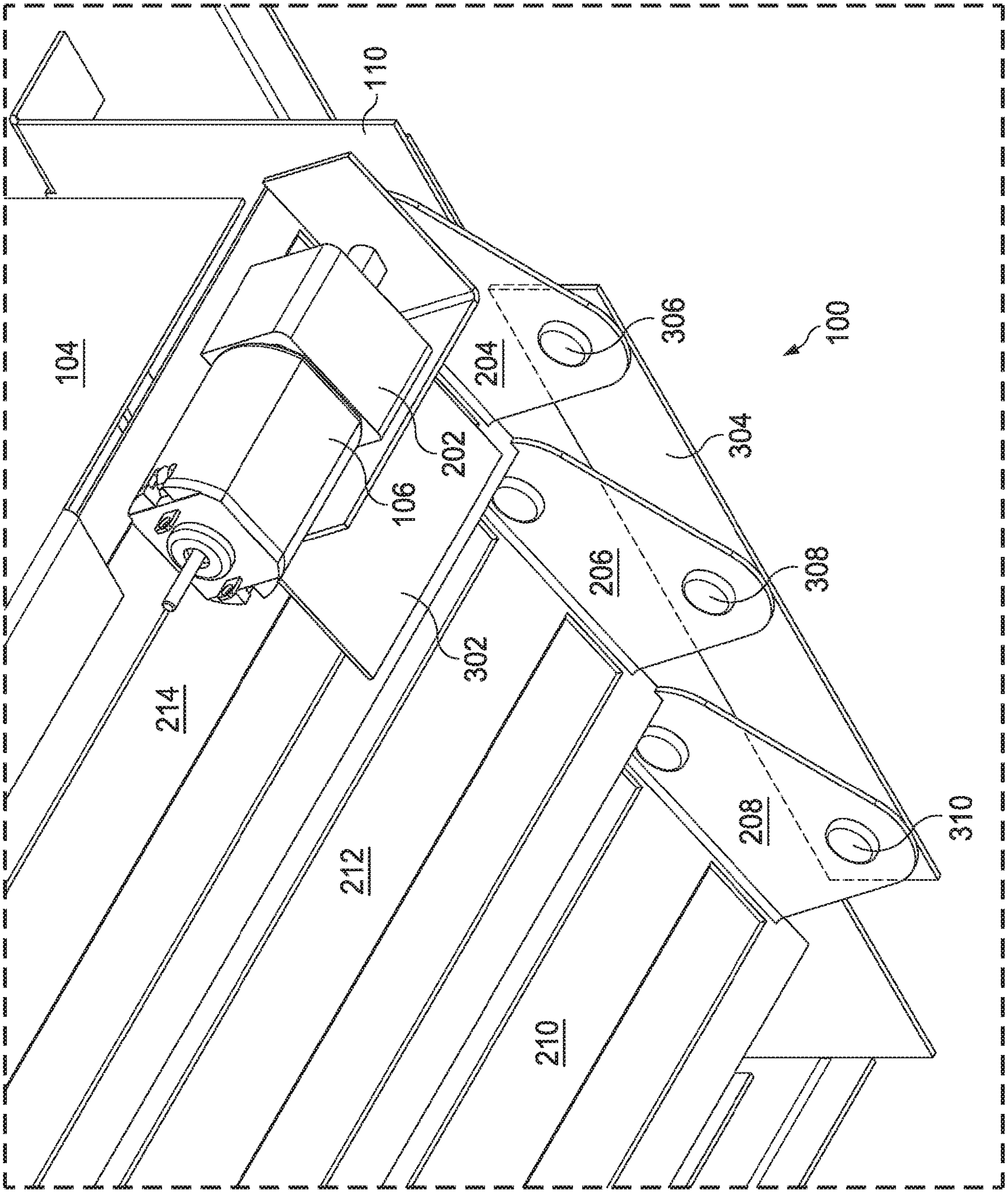
FIG. 3 is a diagram showing a detail view of a damper unit, in accordance with an exemplary embodiment of the present disclosure.

FIG. 3 is a diagram showing a detail view of damper unit 100, in accordance with an exemplary embodiment of the present disclosure. FIG. 3 includes blade shaft 304, which is coupled to blade arms 204, 206 and 208 by bearings 306, 206 and 208, respectively. When blade arm 204 rotates on drive shaft 108, a force is applied to transmission assembly 304 that is transferred through blade shaft 304 to blade arms 206 and 208, which open blades 212 and 210, respectively. Support 302 is coupled to actuator 106, gearbox 202 and blade 214, and transfers force from actuator 106 to blade 214 to cause blade 214 to rotate.

In operation, placement of actuator 106 on blade 214 reduces the footprint of actuator 106 within the vent opening of grill 102. Unlike prior art designs that use an actuator 106 that is placed adjacent to blades 210, 212 and 214, and which thus reduces the vent opening area, damper unit 100 results in an increase in the area of the opening of grill 102, which reduces pressure drop and increases flow rate.

Figure 4:
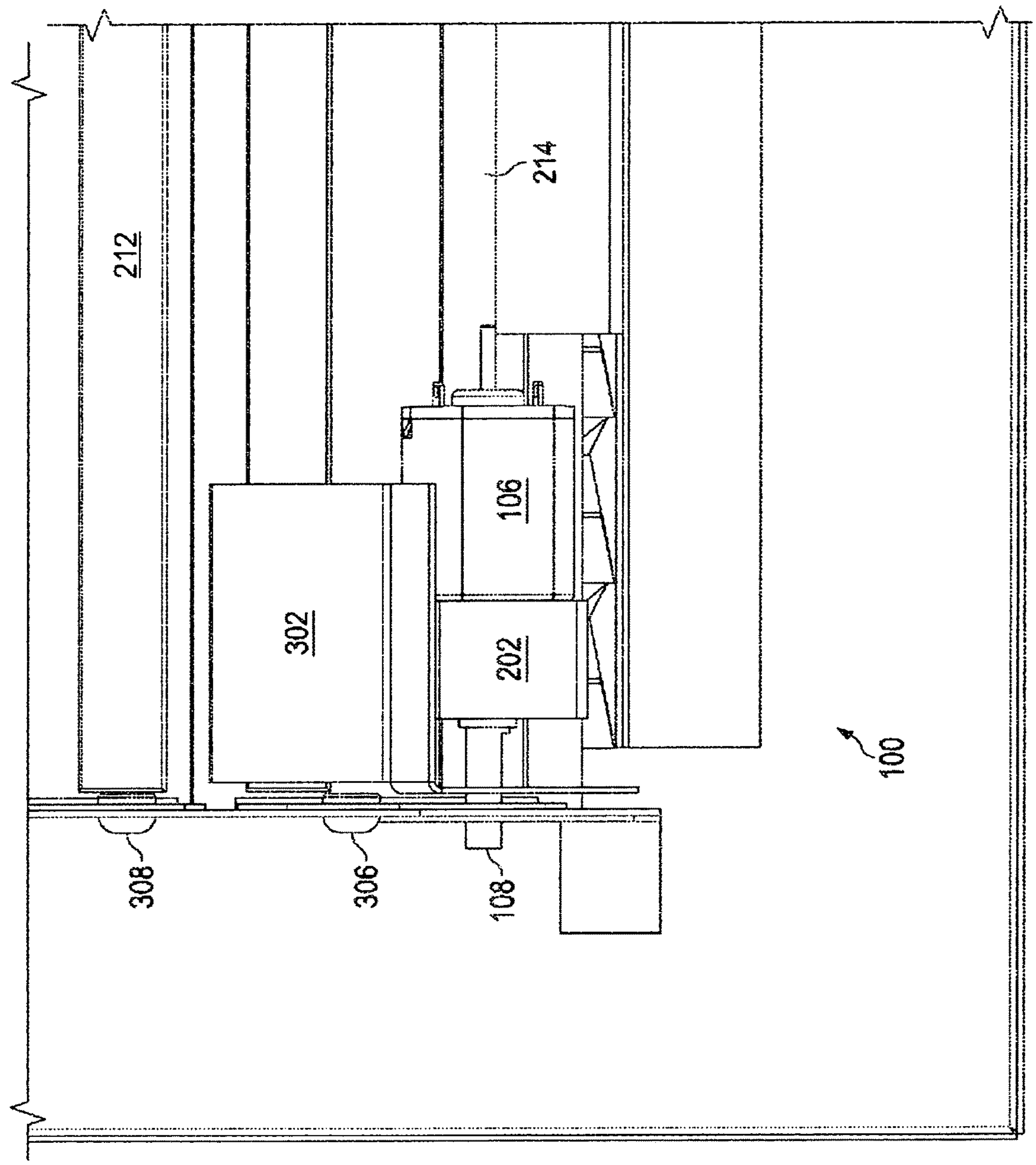
FIG. 4 is a diagram showing a detail view of a damper unit, in accordance with an exemplary embodiment of the present disclosure.

FIG. 4 is a diagram showing a detail view of damper unit 100, in accordance with an exemplary embodiment of the present disclosure. As shown in FIG. 4, drive shaft 108 extends through support 302 and blade arm 204 and interlocks with support 110. Actuator 106 causes gearbox 202 to turn and rotate about drive shaft 108, which causes support 302 to cause blade 214 to rotate relative to drive shaft 108 and support 110.

Figure 5A:
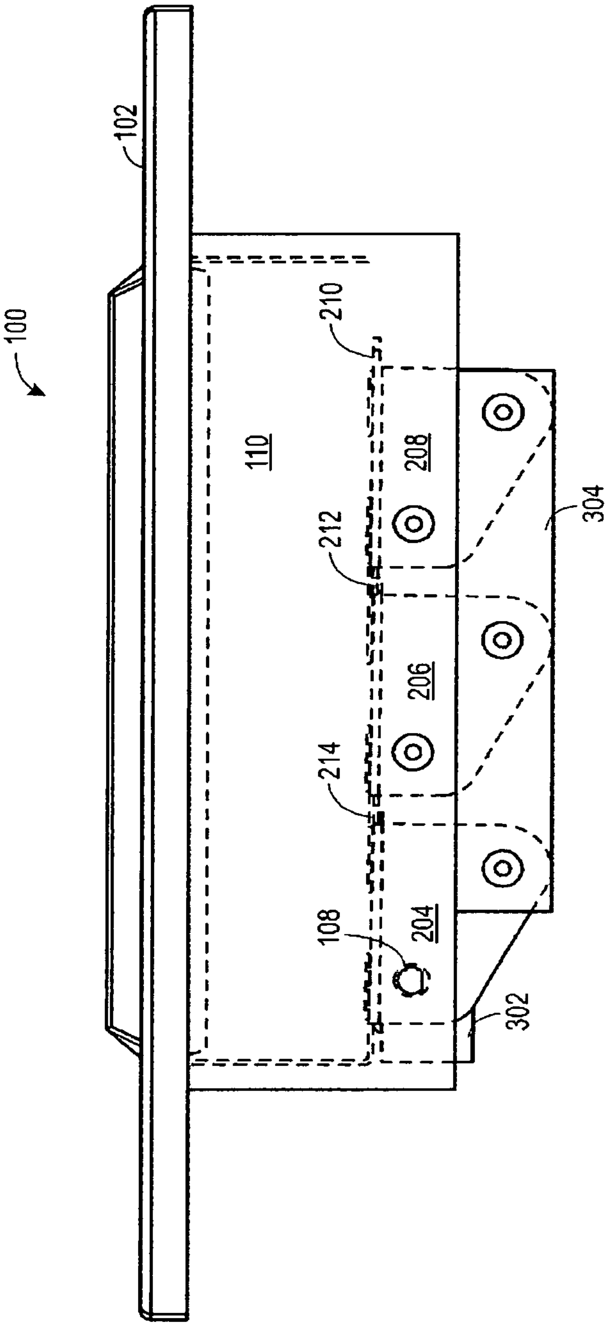
FIGS. 5A and 5B are diagrams showing a damper unit with dampers in an open and closed position, in accordance with an exemplary embodiment of the present disclosure.
Figure 5B:
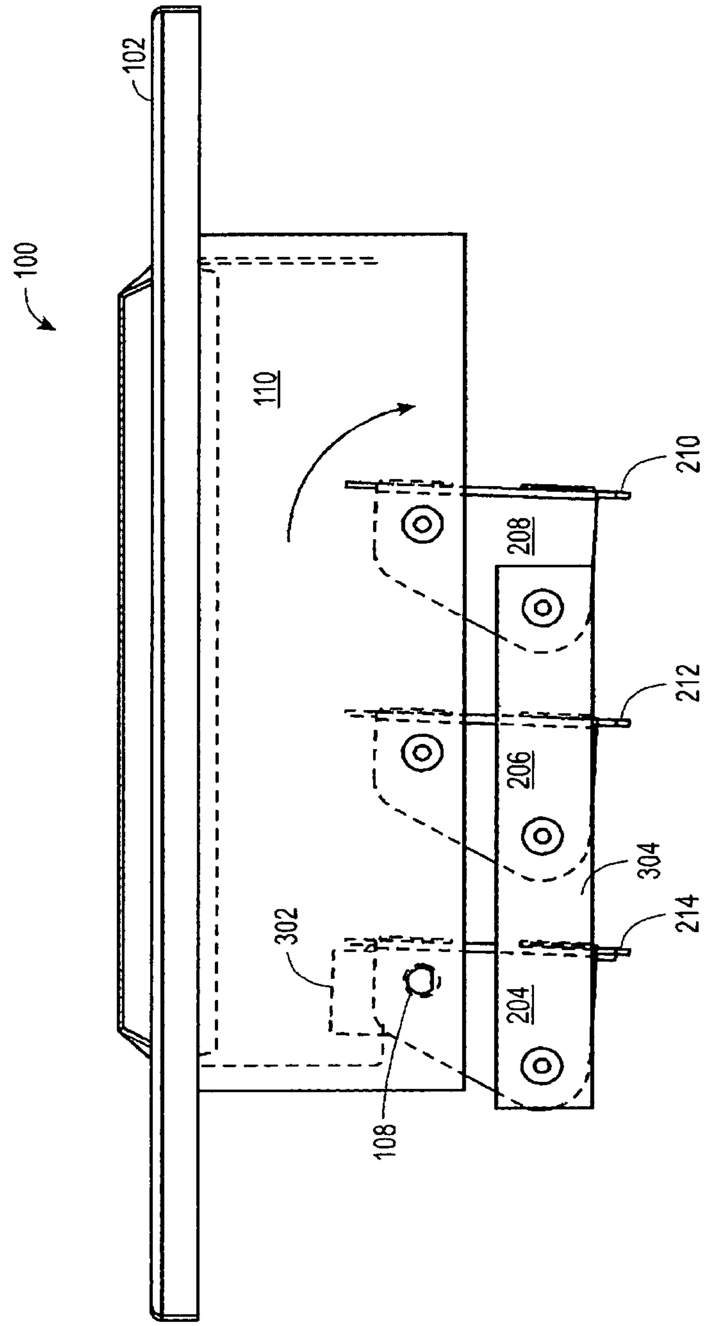

FIGS. 5A and 5B are diagrams showing damper unit 100 with dampers in a closed and open position, respectively, in accordance with an exemplary embodiment of the present disclosure. As shown in FIG. 5A, blade arms 204, 206 and 208 are coupled to blades 214, 212 and 210, respectively, and are in a closed position, with blades 214, 212 and 210 flush and aligned. In FIG. 5B, blade arms 204, 206 and 208 and blades 214, 212 and 210, respectively, have rotated 90 degrees, such that blades 214, 212 and 210 are fully opened. Notably, drive shaft 108 remains fixed with respect to support 110, but actuator 106 rotates with blade 214 and blade arm 204, to which it is attached.

Figure 6A:
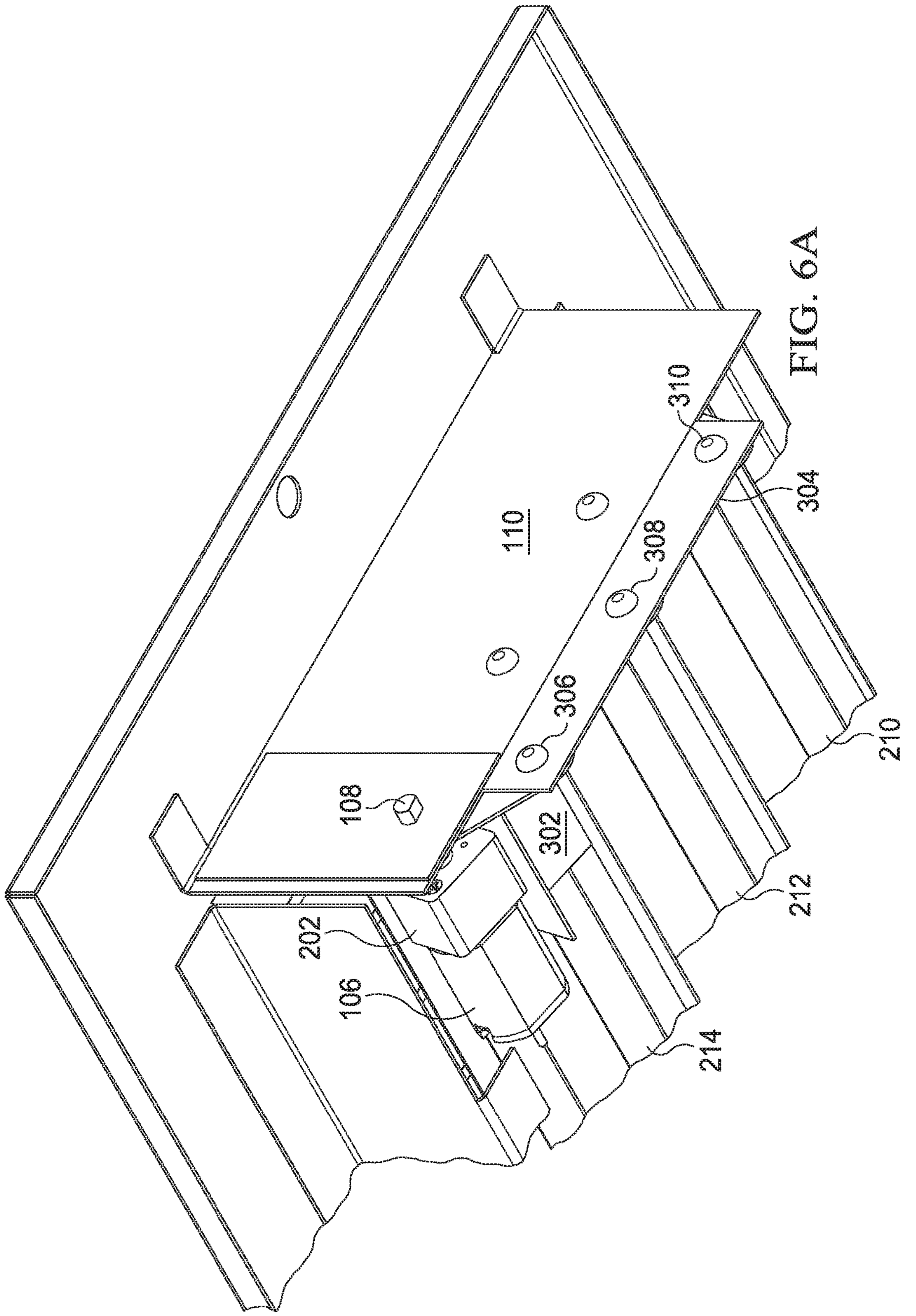
FIGS. 6A through 6C are a sequence of views showing blade arms and blades, respectively, rotating from a closed to an open position.
Figure 6B:
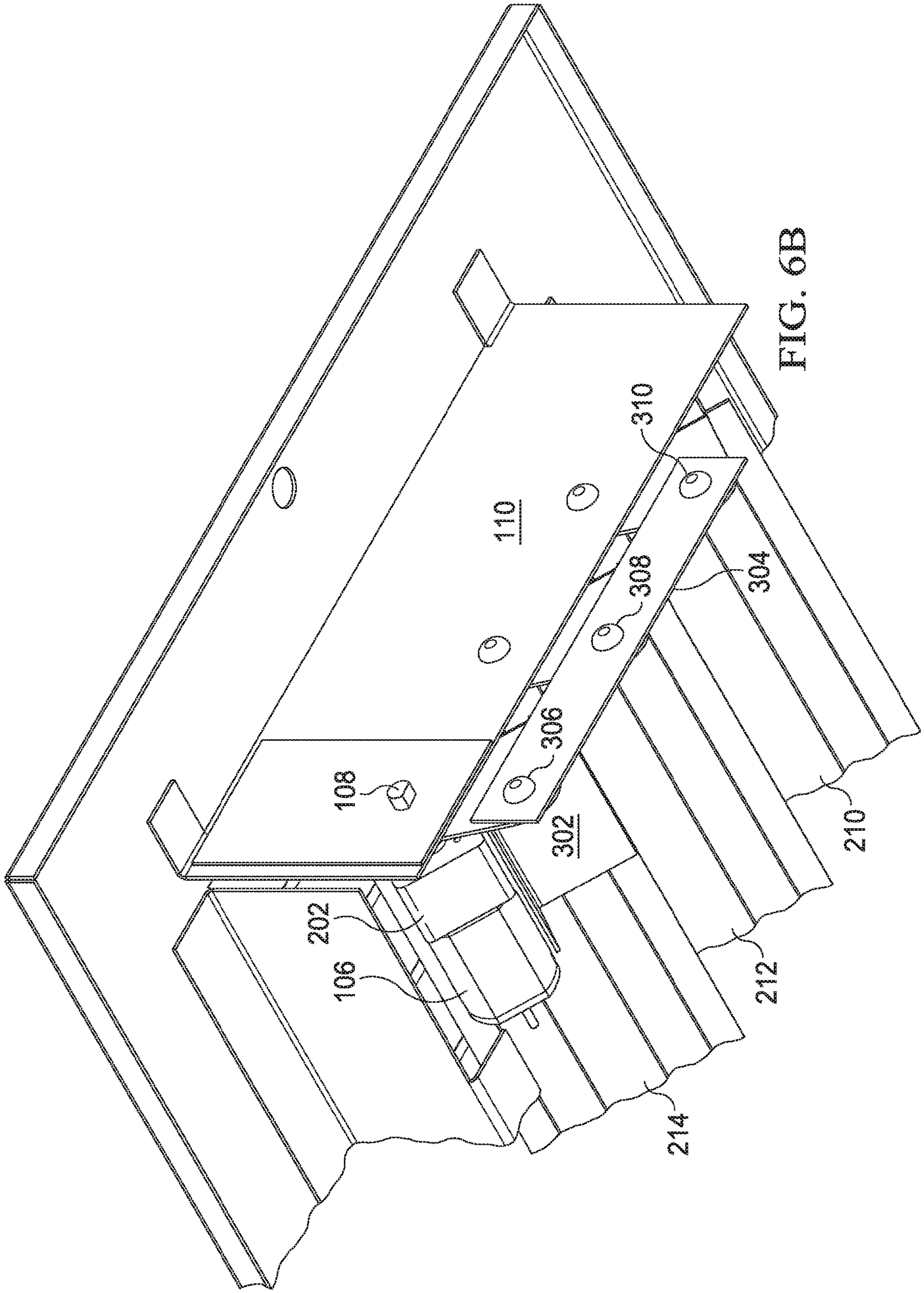
Figure 6C:
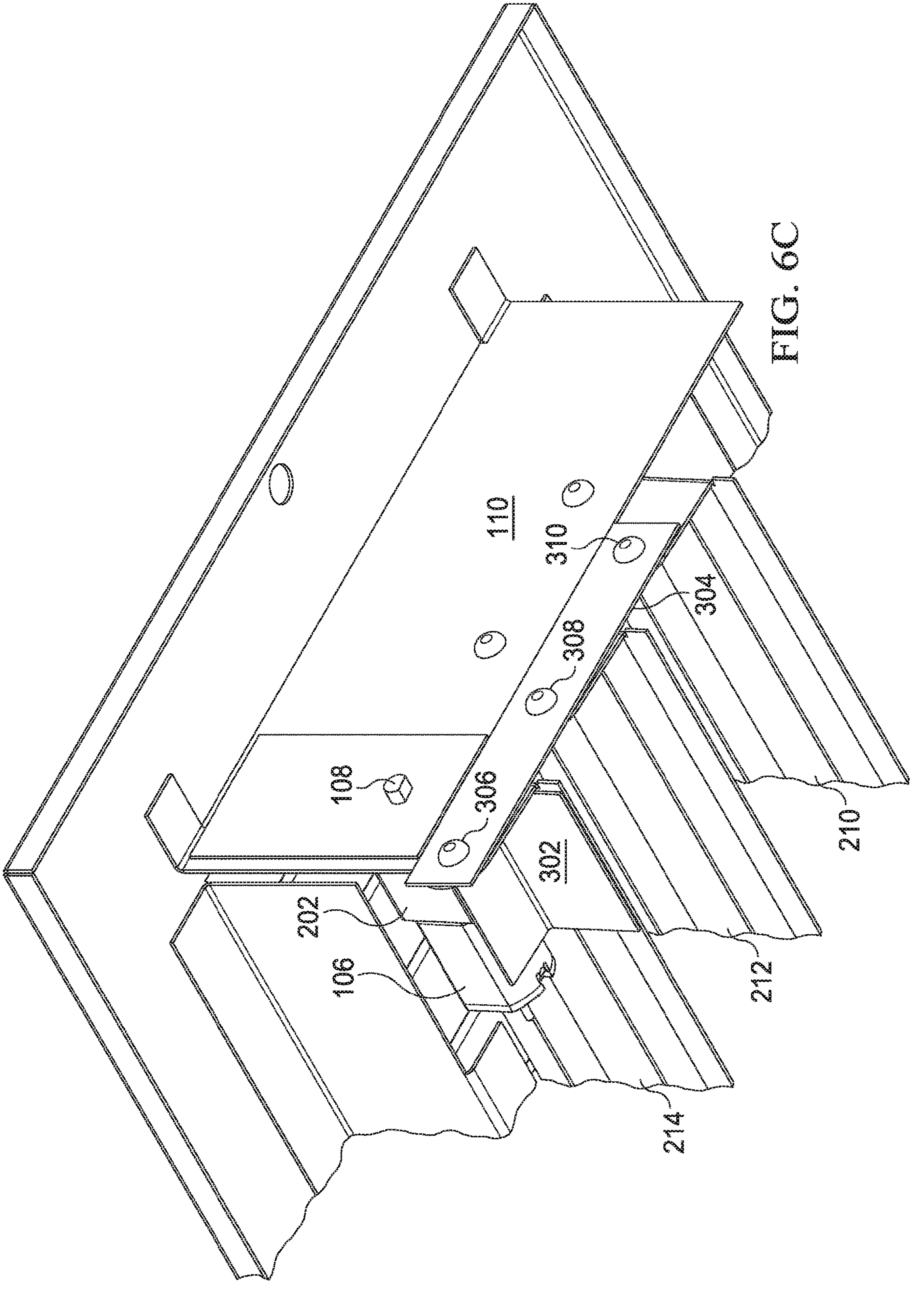

FIGS. 6A through 6C are a sequence of views showing blade arms 204, 206 and 208 and blades 214, 212 and 210, respectively, rotating from a closed to an open position. In FIG. 6A, blades 214, 212 and 210 are in a closed position, and blade shaft 304 is adjacent to support 110. In FIG. 6B, blade 214, 212 and 210 have started to rotate, and blade shaft 304 is separated from support 110. It can also be seen that shaft 108 remains fixed with respect to support 110 as the blades rotate, but that actuator 106 and support 302 rotate with blade arm 204 and blade 214. FIG. 6C shows blades 214, 212 and 210 in a fully open position, with blade shaft 304 adjacent to support 110 in a new location that is different from the location of blade shaft 304 when blades 214, 212 and 210 are closed. In addition, support 302 can be more clearly seen in FIG. 6C, and it can also be seen that shaft 108 has remained fixed in support 110.

Figure 7:
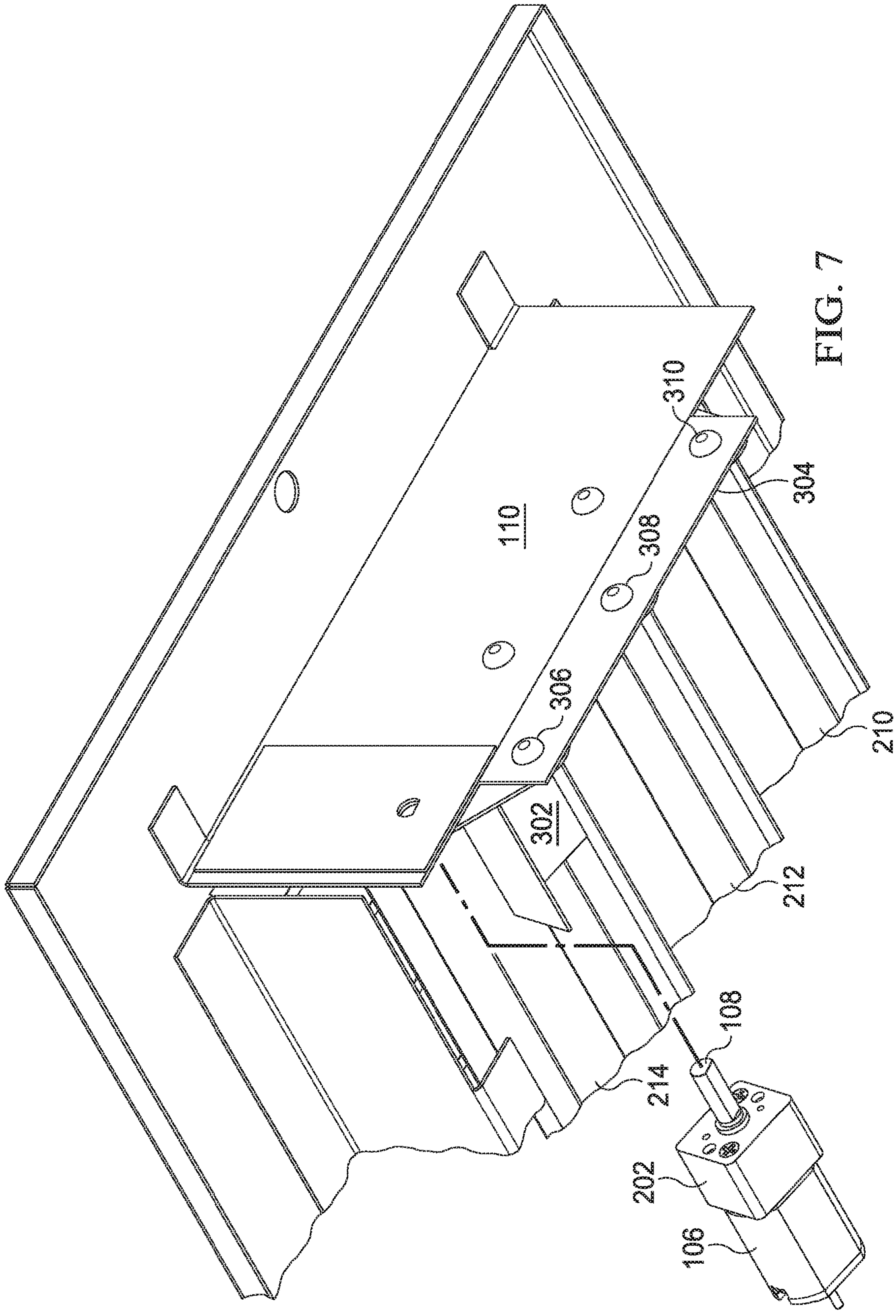
FIG. 7 is a diagram showing how the actuator, gearbox and shaft interface with the support.

FIG. 7 is a diagram showing how actuator 106, gearbox 202 and shaft 108 interface with support 110. Gearbox 202 and/or actuator 106 are coupled to support 302, which is in turn coupled to blade arm 204 and/or blade 214, so as to transfer torque from gearbox 202 and/or actuator 106 to blade arm 204 and/or blade 214. Blade arm 204 and/or blade 214 in turn transfer torque to blade arms 206 and 208 and blades 212 and 210, respectively, through blade shaft 304.

Figure 8:
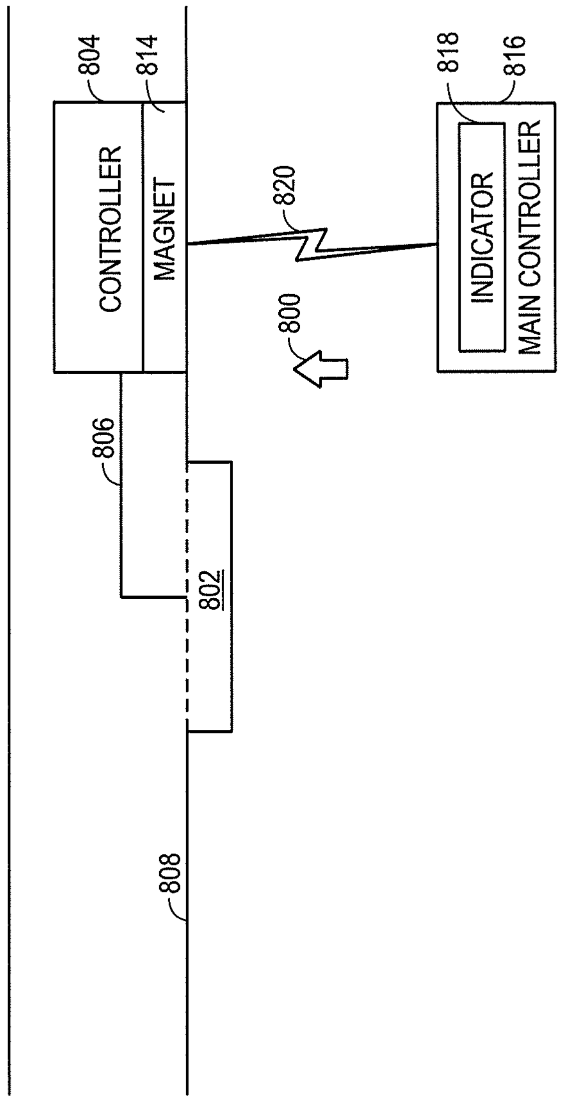
FIG. 8 is a diagram of a system using a tethered control for a direct drive motor integrated into a damper blade, in accordance with an exemplary embodiment of the present disclosure.

FIG. 8 is a diagram of a system 800 using a tethered control for a direct drive motor integrated into a damper blade, in accordance with an exemplary embodiment of the present disclosure. System 800 includes damper unit 802, which is disposed on duct 808, and which is coupled to controller 804 by tether or control cable 806. Controller 804 is disposed within duct 808 at a predetermined distance away from damper unit 802, and is coupled to duct 808 by magnetic clasp 814, Velcro, a reusable adhesive, hooks, clasps or other suitable mechanisms.

Damper unit 802 can include damper 100 and additional components, such as one or more position sensors, to allow the position of the dampers to be determined (such as fully closed, fully opened, one or more partially open/closed positions, and so forth). Damper unit 802 can include a blade-mounted direct drive motor to reduce air flow resistance, and can be used in conjunction with tethered controller 804, which is separated from damper unit 802 by tether 806, to reduce the air flow resistance created by controller 804.

Controller 804 can include an STM 300 energy harvesting wireless sensor module, available from Enocean of Munich, Germany, or other suitable controllers. In one exemplary embodiment, controller 804 can use an airflow-driven turbine and generator to generate electricity for use in controlling the operation of damper unit 802 and controller 804, communications between controller 804 and a remote central controller, and for other suitable purposes. Tether 806 can include one or more insulated conductors that are used to provide communications and power between damper 802 and controller 804. In one exemplary embodiment, tether 806 is long enough to allow controller 804 to be disposed within duct 808 so as to prevent disruptions to the air flow through duct 808 caused by the presence of controller 804 from causing a loss of air flow through damper unit 802.

Main controller 816 is wirelessly coupled to controller 804 by wireless media 820, although other suitable connections can also or alternatively be used. Main controller 816 includes an indicator 818 that alerts an operator to a status of controller 804, such as a low voltage status, a failure to respond to a poll or other suitable status indicators. In one exemplary embodiment, indicator 818 can be implemented using a graphic user interface on a tablet computer, a desktop computer, a smart phone or in other suitable manners, where the indication can be provided to an operator on call or other suitable personnel.

Figure 9:
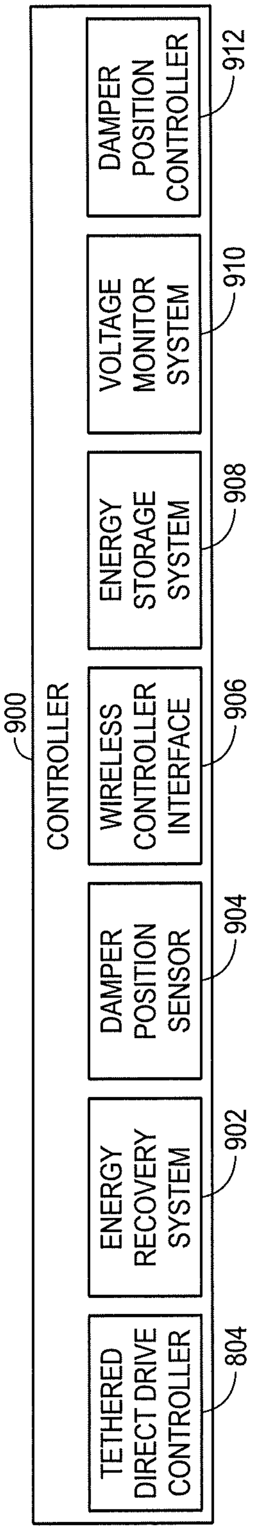
FIG. 9 is a diagram of a controller for controlling a tethered direct drive motor integrated into a damper blade, in accordance with an exemplary embodiment of the present disclosure.

FIG. 9 is a diagram of a controller 900 for controlling a tethered direct drive motor integrated into a damper blade, in accordance with an exemplary embodiment of the present disclosure. Controller 900 includes tethered direct drive controller 804 and energy recovery system 902, damper position sensor 904, wireless controller interface 906, energy storage system 908, voltage monitor system 910 and damper position controller 912, each of which can be implemented in hardware or a suitable combination of hardware and software.

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

Energy recovery system 902 is configured to recover ambient energy from the environment and to store the energy, such as locally or in energy storage system 908, for use in controlling the operation of controller 900 and one or more dampers, such as damper 802. In one exemplary embodiment, energy recovery system 902 can use a miniature turbine and generator that is disposed within duct 808 to generate electricity that is stored for use in controlling damper 802, such as where damper 802 has a failsafe open position to ensure that energy can be provided to energy recovery and storage system 902 after an extended period of dormant operations, by simply actuating blowers or fans that create air flow within duct 808. In another exemplary embodiment, Peltier effect devices, Seebeck effect devices or other suitable devices can also or alternatively be used to generate electricity from ambient conditions.

Damper position sensor 904 receives electrical signals or other suitable data from one or more sensors that are disposed on damper 802 or other suitable devices and determines a position of the damper blades. In one exemplary embodiment, the sensors can be used to generate a first indication when the damper blades are in a fully open position, such as a first low resistance measurement between a first and second conductor, and a second indication when the damper blades are in a fully closed position, such as a second low resistance measurement between a third and fourth conductor. Likewise, other suitable sensors or indicators can be used to generate an indication of the status of one or more dampers.

Wireless controller interface 906 can receive control data from and transmit control data to a remote controller, such as directly using a wireless connection, through an ad hoc network of wireless devices or in other suitable manners. In one exemplary embodiment, wireless controller interface 906 can be configured to listen for control data transmitted at one or more first frequencies and to generate responsive data on one or more second frequencies, and can further include programmable functionality to allow a control device to actuate a powered damper device.

Energy storage system 908 can be implemented as a rechargeable battery, a replaceable battery, an energy storage capacitor or in other suitable manners. In one exemplary embodiment, energy storage system 908 can be replaceable batteries that are used with a suitable notification algorithm, such as that disclosed in FIG. 10, to alert a user when the replaceable batteries need replacement and to otherwise prevent an associated damper from being stuck in a closed position. In another exemplary embodiment, energy storage system 908 can be implemented using a rechargeable battery, an energy storage capacitor or other suitable devices that can be recharged by energy recovery system 902 or in other suitable manners.

Voltage monitor system 910 monitors a voltage of energy storage system 908, such as to generate an alert that replaceable batteries require replacement, to reset a position of an associated damper, or for other suitable functions. The voltage level can be representative of a charge state of the replaceable batteries, such as where the voltage level as a function of charge state follows a predetermined characteristic. For example, a fully charged replaceable battery can have a voltage at a first voltage level, and as the charge depletes, the voltage level can drop. In this manner, when the voltage level drops to a first predetermined level that is close to a complete loss of stored energy, an alert can be generated. Likewise, when the voltage level drops to a second level that is slightly greater than the depletion voltage level, the remaining stored energy can be used to set the damper in a fail-safe position, such as fully open or fully closed.

In one exemplary embodiment, voltage monitor system 910 can interface with a programmable controller to control the operation of damper position controller 912, such as to open a damper when a voltage is lower than a first set point. In another exemplary embodiment, voltage monitor system 910 can generate an alert when a voltage level is lower than a second set point, such as to alert an operator of the need to replace batteries or to perform other suitable maintenance.

Damper position controller 912 generates damper position control signals, such as to open or close a damper by providing a signal to a damper position motor. In one exemplary embodiment, a damper position motor can open when current is provided in a first direction, and can close when current is provided in a second direction. Likewise, other suitable processes can also or alternatively be used, such as stepper positions.

Figure 10:
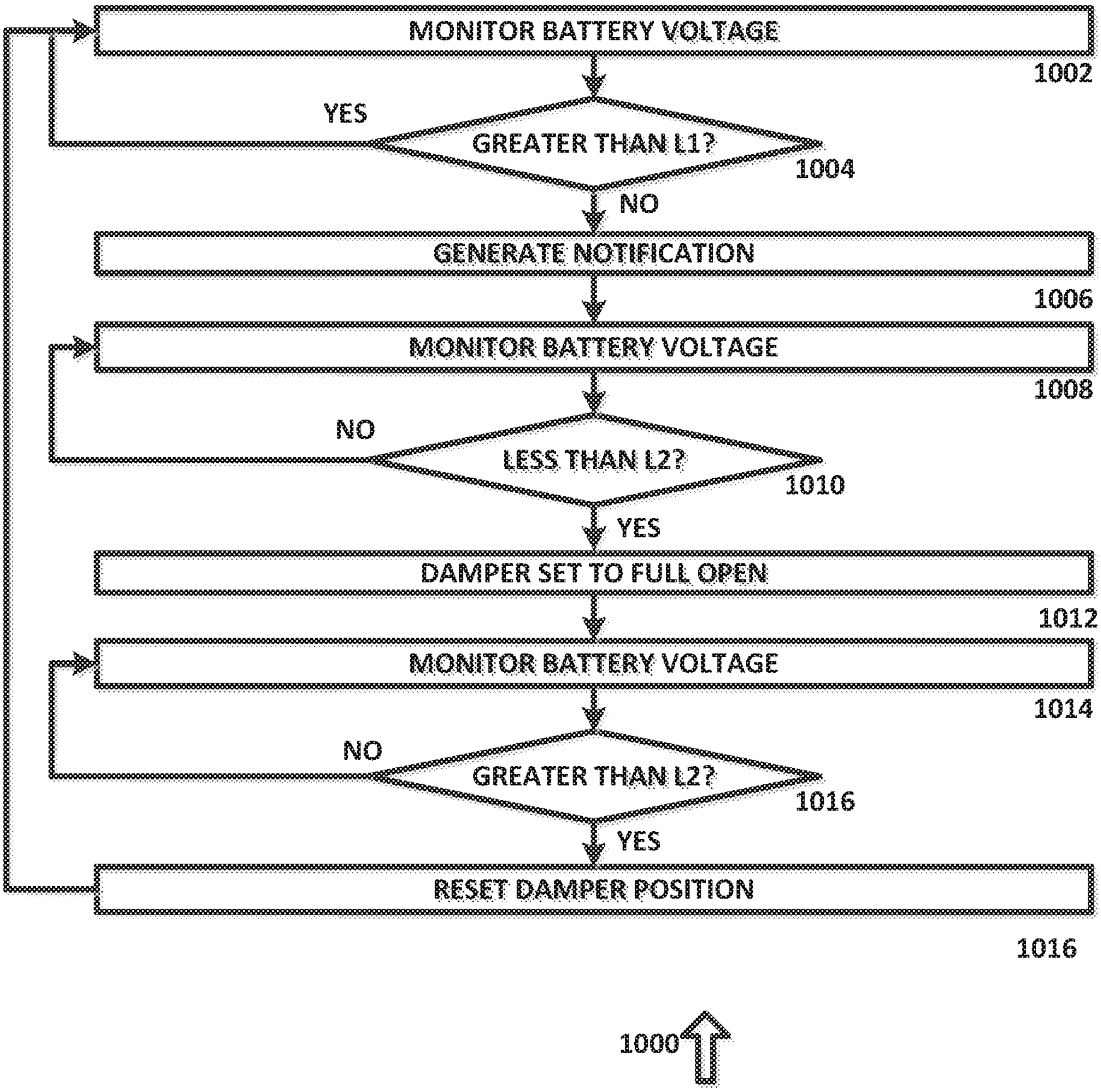
FIG. 10 is a diagram of an algorithm for tethered control of a damper, in accordance with an exemplary embodiment of the present disclosure.

FIG. 10 is a diagram of an algorithm 1000 for tethered control of a damper, in accordance with an exemplary embodiment of the present disclosure. Algorithm 1000 can be implemented in hardware or a suitable combination of hardware and software, and can be one or more algorithms operating on an STM 300 controller or other suitable controllers.

Algorithm 1000 begins at 1002, where a battery voltage is monitored. In one exemplary embodiment, the battery voltage can be monitored by reading a voltage differential across battery terminals or in other suitable manners. The battery voltage can be monitored on a periodic basis, such as every ten minutes, or in other suitable manners. The algorithm then proceeds to 1004.

At 1004, it is determined whether the measured voltage is greater than a first voltage level L1. If it is determined that the measured voltage is greater than the first voltage level L1, then the algorithm returns back to 1002, otherwise the algorithm proceeds to 1006.

At 1006, a notification is generated, such as to alert a user to replace the batteries, to perform maintenance or for other suitable purposes. The algorithm then proceeds to 1008.

At 1008, the battery voltage is monitored. In one exemplary embodiment, the battery voltage can be monitored by reading a voltage differential across battery terminals or in other suitable manners. The battery voltage can be monitored on a periodic basis, such as every ten minutes, or in other suitable manners. The algorithm then proceeds to 1010.

At 1010, it is determined whether the measured voltage is less than a second voltage level L2. If it is determined that the measured voltage is not less than the second voltage level L2, then the algorithm returns back to 1008, otherwise the algorithm proceeds to 1012.

At 1012, the damper is set to a full open position, such as to prevent the damper from losing power in a closed position. In one exemplary embodiment, a control signal can be generated to cause a damper position controller to open fully, such as to generate a sequence of digital data signals that cause the damper position controller to perform a predetermined action. The algorithm then proceeds to 1014.

At 1014, the battery voltage is monitored. In one exemplary embodiment, the battery voltage can be monitored by reading a voltage differential across battery terminals or in other suitable manners. The battery voltage can be monitored on a periodic basis, such as every ten minutes, or in other suitable manners. The algorithm then proceeds to 1016.

At 1016, it is determined whether the measured voltage is greater than the second voltage level L2. If it is determined that the measured voltage is not greater than the second voltage level L2, then the algorithm returns back to 1014, otherwise the algorithm proceeds to 1016.

At 1016, the damper position is reset from a fail-safe fully open position. In one exemplary embodiment, a damper controller can wirelessly request a damper position setting from a remote control system, and can generate a digital data control signal to cause the damper position controller to change a position of the damper, or other suitable processes can also or alternatively be used. The algorithm then returns to 1002.

In operation, algorithm 1000 allows a tethered unit controller to monitor a battery voltage and to generate an alert, such as if a replaceable battery requires replacement or for other suitable reasons. Although algorithm 1000 is shown as a flow chart, a state diagram, object oriented programming techniques or other suitable processes can also or alternatively be used.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for controlling air flow, comprising:

a damper disposed on a duct;

an energy recovery system disposed within the duct a first predetermined distance from the damper;

a rotary motor configured to drive rotation of a blade of the damper about an axis;

a support including a first flange configured to couple to the rotary motor and a second flange configured to couple to a surface of the blade, wherein the first and second flanges rigidly connected, wherein the surface of the blade extends in a direction along the axis;

and a controller coupled to the damper and to the energy recovery system, wherein the controller is disposed within the duct a second predetermined distance from the damper, and wherein the controller is coupled to the damper by a conductor.

2. The system of claim 1 wherein the energy recovery system is coupled to the controller.

3. The system of claim 1 further comprising an energy storage system coupled to the energy recovery system and configured to store energy for operation of the controller and the damper.

4. The system of claim 1 wherein the controller is coupled to the duct by a magnetic clasp.

5. The system of claim 1 further comprising a main controller wirelessly coupled to the controller, wherein the main controller further comprises an indicator configured to generate a status indication for the controller.

6. The system of claim 1, wherein the energy recovery system is configured to generate energy from the air flow.

7. The system of claim 1, wherein the controller further comprises a damper position sensor configured to read one or more position sensors on the damper to determine a degree to which the damper is open.

8. The system of claim 1, wherein the controller further comprises a wireless controller interface configured to transmit data from the controller and to receive external data for the controller.

9. The system of claim 1, wherein the controller further comprises a voltage monitor system configured to monitor a voltage level of an energy storage device.

10. The system of claim 1, wherein the controller further comprises a damper position controller configured to control the rotary motor.

11. A method for controlling air flow, comprising:

disposing a damper on a duct;

disposing an energy storage system within the duct a first predetermined distance from the damper;

disposing a support on a blade of the damper, wherein the support includes a first flange configured to couple to a rotary motor and a second flange configured to couple to a surface of the blade, and wherein the first flange and the second flange are rigidly coupled to one another;

disposing the rotary motor on the first flange of the support, wherein the rotary motor is configured to drive rotation of the blade about an axis, and wherein the surface of the blade extends in a direction along the axis; and controlling an operation of the damper using a controller coupled to the damper by a conductor and to the energy storage system, the controller disposed within the duct.

12. The method of claim 11 wherein controlling the operation of the damper comprises one of opening the damper and closing the damper.

13. The method of claim 11 further comprising determining a charge state of the energy storage system.

14. The method of claim 13 further comprising generating an alert if the charge state of the energy storage system is less than a first level.

15. The method of claim 14 further comprising fully opening the damper if the charge state of the energy storage system is less than a second level.

16. The method of claim 15 further comprising changing a position of the damper if the charge state of the energy storage system increases from below the second level to above the second level.

17. A system for controlling air flow comprising:

a damper disposed on a duct;

an energy recovery system disposed within the duct a first predetermined distance from the damper and a damper controller coupled to the damper and to the energy recovery system, the damper controller disposed within the duct a second predetermined distance from the damper, wherein the energy recovery system is coupled to the damper controller;

an energy storage system coupled to the energy recovery system and configured to store energy for operation of the damper controller and the damper, wherein the damper further comprises:

a rotary motor configured to drive rotation of a blade of the damper about an axis; and a support including a first flange configured to couple to the rotary motor and a second flange configured to couple to a surface of the blade, wherein the first flange and the second flange are rigidly coupled on one another, wherein the surface of the blade extends in a direction along the axis, and wherein the damper controller is disposed in the duct and is coupled to the duct by a magnetic clasp; and a main controller wirelessly coupled to the damper controller, wherein the main controller further comprises an indicator configured to generate a status indication for the damper controller, wherein the energy recovery system is configured to generate energy from the air flow to be stored by the energy storage system, and wherein the damper controller further comprises:

a damper position sensor configured to read one or more position sensors on the damper to determine a degree to which the damper is open;

a wireless controller interface configured to transmit data from the damper controller and to receive external data for the damper controller; and a voltage monitor system configured to monitor a voltage level of an energy storage device, wherein the damper controller is configured to:

control an operation of the damper via the rotary motor, wherein the rotary motor is configured to open and close the damper;

determine a charge state of the energy storage system;

generate an alert if the charge state of the energy storage system is less than a first level;

fully open the damper if the charge state of the energy storage system is less than a second level; and change a position of the damper if the charge state of the energy storage system increases from below the second level to above the second level.

* * * * *